United States Patent [19]

Kassai

[11] Patent Number: 4,616,371
[45] Date of Patent: Oct. 14, 1986

[54] BED FOR BABY CARRIAGES

[75] Inventor: Kenzou Kassai, Osaka, Japan

[73] Assignee: Aprica Kassai Kabushikikaisha, Osaka, Japan

[21] Appl. No.: 781,192

[22] Filed: Sep. 25, 1985

Related U.S. Application Data

[62] Division of Ser. No. 583,130, Feb. 24, 1984, abandoned.

[30] Foreign Application Priority Data

Mar. 2, 1983 [JP] Japan ................................. 58-35000

[51] Int. Cl.⁴ .......................... B62B 9/12; A47D 7/01
[52] U.S. Cl. ........................................ 5/99 A; 5/102;
280/643; 280/648; 297/118
[58] Field of Search ............................ 5/99, 101–107,
5/93, 94, 97, 98; 280/47.4, 643, 648, 47.39;
297/433, 118

[56] References Cited

U.S. PATENT DOCUMENTS

| | | | |
|---|---|---|---|
| 2,429,350 | 10/1947 | Farrand ................................ | 5/98 R |
| 3,049,728 | 8/1962 | Lund .................................... | 5/98 R |
| 3,916,802 | 4/1975 | Virtue et al. ........................ | 5/93 R |
| 3,971,079 | 7/1976 | Fleischer ............................. | 5/97 |
| 4,181,356 | 1/1980 | Fleischer ............................. | 280/47.4 |

Primary Examiner—Alexander Grosz
Attorney, Agent, or Firm—W. G. Fasse; D. H. Kane, Jr.

[57] ABSTRACT

This invention is a baby carriage bed (1) of the so-called "box type" which is basically in the form of a box as a whole comprising a bottom wall (2), a front wall (3), a back wall (4), and left-hand and right-hand side walls (5, 6). In such box-shaped bed (1), when the forwardly disposed walls (2a, 3, 5a, 6a) are displaced to another place and when particularly in the bottom wall (2) its rear portion (2b) alone is left to form the seat of a chair, a chair form is established. To provide the necessary arrangement therefor, a pair of longitudinally slidable draw links (12) are installed on both sides under the bottom wall (2), so that when the draw links (12) are forwardly withdrawn, they hold the front portions (2a, 5a, 6a) of the bottom wall (2) and left-hand and right-hand side walls (5, 6) and the front wall (3). The front portions (5a, 6a) of the left-hand and right-hand side walls (5, 6) are constructed to be separable from the rear portions (5b, 6b). The front portion (2a) of the bottom (2) is constructed so that it can be displaced with respect to the rear portion (2b) for example by sliding or turning. When the draw links (12) are rearwardly retracted, the front portions (2a, 5a, 6a) of the bottom wall (2) and left-hand and right-hand side walls (5, 6) are displaced in such a manner as to open the front of the baby carriage bed to enable the bed to be used as a chair.

1 Claim, 12 Drawing Figures

BED FOR BABY CARRIAGES

CROSS-REFERENCE TO RELATED APPLICATION

The present application is a divisional patent application of previously copending U.S. Ser. No. 583,130, filed on Feb. 24, 1984, now abandoned.

BACKGROUND OF THE INVENTION

1. Field of the Invention

This invention relates to a bed for baby carriages and particularly it relates to a bed for baby carriages which is collapsible, wherein a portion for supporting a baby is basically in the form of a bed capable of taking the form of a chair when desired.

2. Description of the Prior Art

Originally or at least when the baby carriage was first proposed, it was of the so-called "box-type" in which a baby is comfortably laid in the baby carriage. For babies, therefore, the box type is preferable from the standpoint of their growth and is superior in baby carriage livableness or comfortableness. However, the change of times has gradually taken the edge off such baby-centered construction concept and placed more importance on the convenience of baby carriages as a means for conveying babies. For example, the chair type has predominated in baby carriages and, further, because of the use of means of transportation, collapsible small-sized baby carriages are most popular. This is an inevitable consequence of various changes in life style and is one of the needs of the times.

The convenience of baby carriages as a means for conveying babies, as described above, is an important consideration in developing a new baby carriage. However, it seems necessary to go back to the starting point to think over what construction a baby carriage should have which does not hamper a baby's growth and does not reduce the comfortableness of a baby carriage and which is convenient to use.

SUMMARY OF THE INVENTION

An object of this invention is to provide a bed for a baby's carriages which does not hamper baby growth or degrade the comfort provided by a baby carriage, as described above. According to this invention, the bed is adapted to change its shape into chair form.

This invention provides a bed for baby carriages which is of the so-called "box-type" and is basically in the form of a box as a whole comprising a bottom wall, a front wall, a back wall, and right-hand and left-hand side walls. In such box-shaped bed, when the walls disposed in the front are displaced to another place and when particularly in the bottom wall its rear portion alone is left to form the seat of a chair, the bed takes the form of a chair. For this purpose the present construction comprises a pair of draw links longitudinally slidably installed on opposite sides under the bottom wall, so that said draw links, when forwardly withdrawn, hold the front portions of the bottom wall and left-hand and right-hand side walls, and the front wall. The front portions of the left-hand and right-hand side walls are constructed to be separable from their rear portions. Further, the front portion of the bottom wall is constructed to be displaceable as by sliding or turning relative to its rear portion. When the draw links are rearwardly retracted, the front portions of the bottom wall and left-hand and right-hand side walls and the front wall are displaced to open the front of the baby carriage bed, enabling the bed to be used as a chair.

According to this invention, there is provided a bed for baby carriages which is in the form of a box which is desirable from the standpoint of a baby's growth and comfort. The change of such basic bed form into the chair form does not require any addition of separately prepared new members or removal of any of the members initially provided as part of the bed. It is only necessary to deform or displace some of the members provided in the bed while they are associated with the others. That is, when the pair of draw links are slid and thereby forwardly withdrawn, they assume the state of holding the members forming the front portion of the bed, while when they are rearwardly retracted, the front portion of the bottom wall is displaced from the predetermined position and other walls are deformed, whereby the front of the bed is opened to enable the bed to be used as a chair. Therefore, there is no danger whatsoever of losing parts which is liable to occur where separable members are provided.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
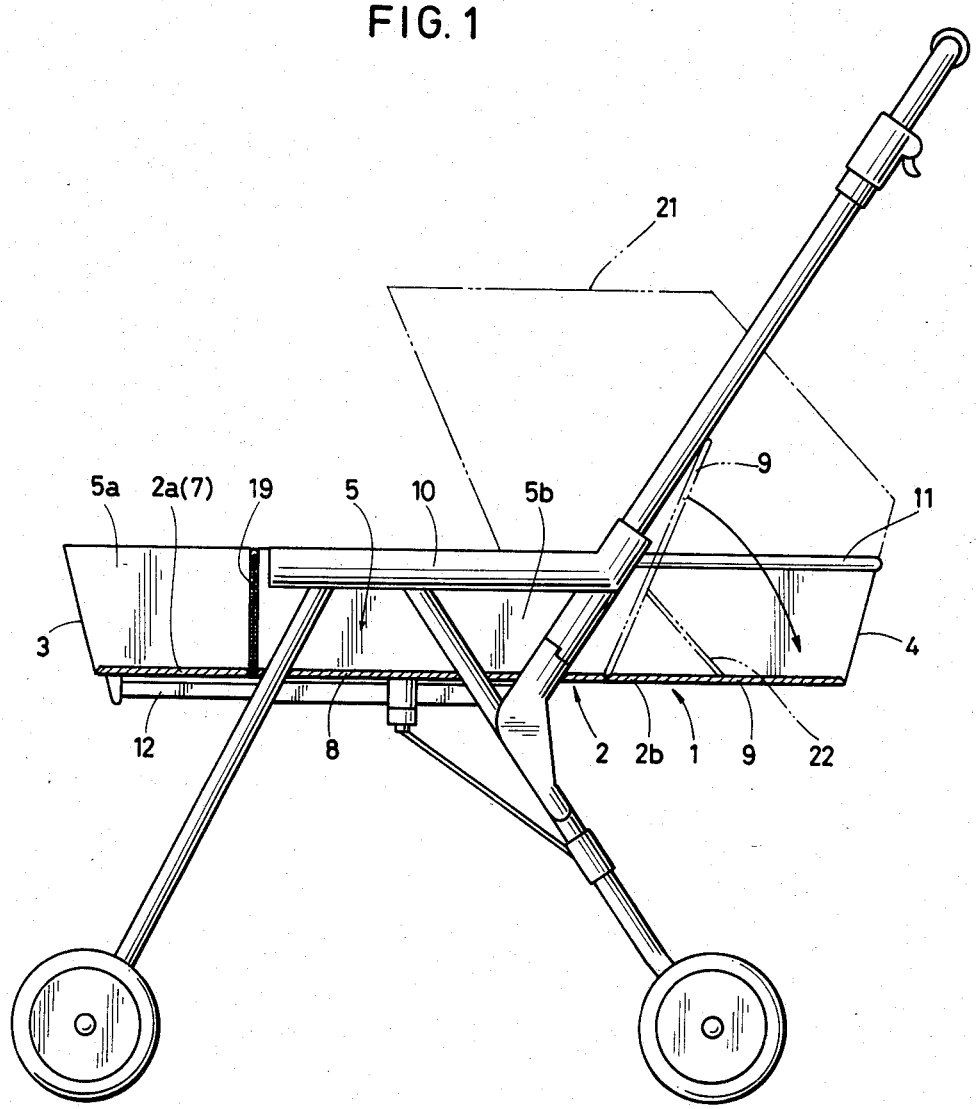
FIG. 1 is a right-hand side view of a baby carriage embodiment of this invention with a bed shown in its original bed form.
Figure 2:
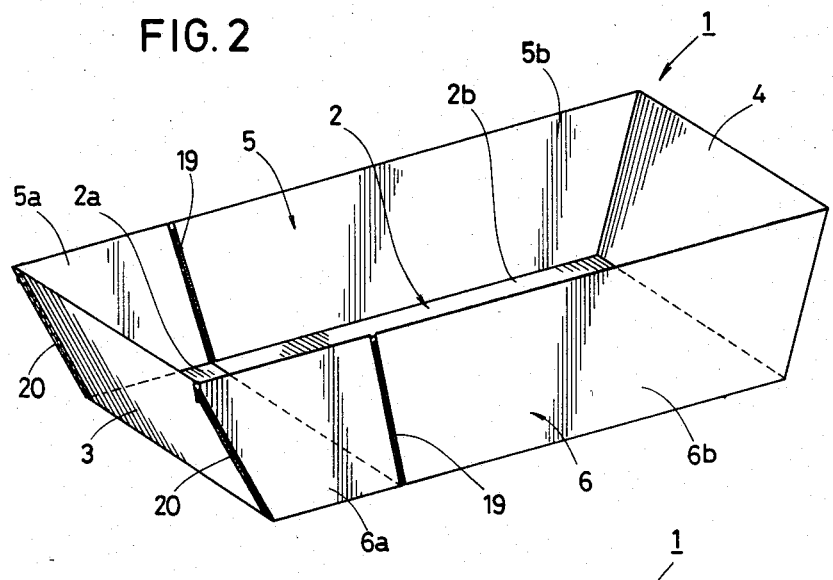
FIG. 2 is a perspective view showing the bed portion of FIG. 1.
Figure 3:
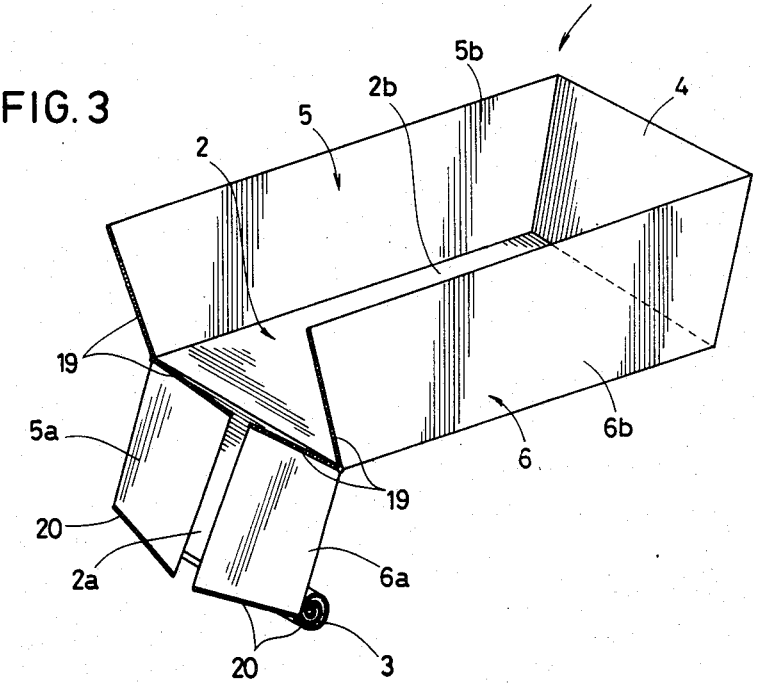
FIG. 3 shows a state in which the bed of FIG. 2 is changed into a chair form.

Referring to FIGS. 1, 2, and 3, the baby carriage bed 1 is in the form of a box comprising a bottom wall 2, a front wall 3, a back wall 4, and left-hand and right-hand side walls 5 and 6. These walls are formed of suitable fabric or the like, and in some portions the flexibility of the fabric or the like is utilized and in other portions hard cores are incorporated to provide a suitable degree of strength or "stiffness."

In FIG. 1, the bed 1 is shown with its right-hand side wall 6 removed. The bottom wall 2 has hard cores incorporated therein which are separated as front and rear portions 2a and 2b. That is, a front core 7 is incorporated in the front portion 2a of the bottom wall 2. In the illustrated embodiment, the rear portion 2b of the bottom wall 2 is divided into two regions, forward and backward, and the forward half region has a rear forward half core 8 incorporated therein and the backward half region has a rear backward half core 9 incorporated therein. The front portions 5a and 6a of the left-hand and right-hand side walls 5 and 6 have hard cores likewise incorporated therein. Although the front wall 3 has no such hard core incorporated therein, its shape is maintained by the front portions 5a and 6a of the left-hand and right-hand side walls 5 and 6. Further, since the rear portions 5b and 6b of the left-hand and right-hand side walls 5 and 6 and the back wall 4 are also held by handrails 10 of the baby carriage body and by frames 11 extending rearwardly of said handrails 10, there is no need to incorporate a hard core therein.

In addition, the front wall 3 has been described as requiring no hard core, but preferably, an elongated core extending along the upper edge of the front wall 3 may be incorporated therein to provide an increased strength.

Two draw links 12 are slidably installed on opposite sides below the bottom wall 2. In FIG. 1, the draw links 12 are shown as forwardly withdrawn.

Figure 4:
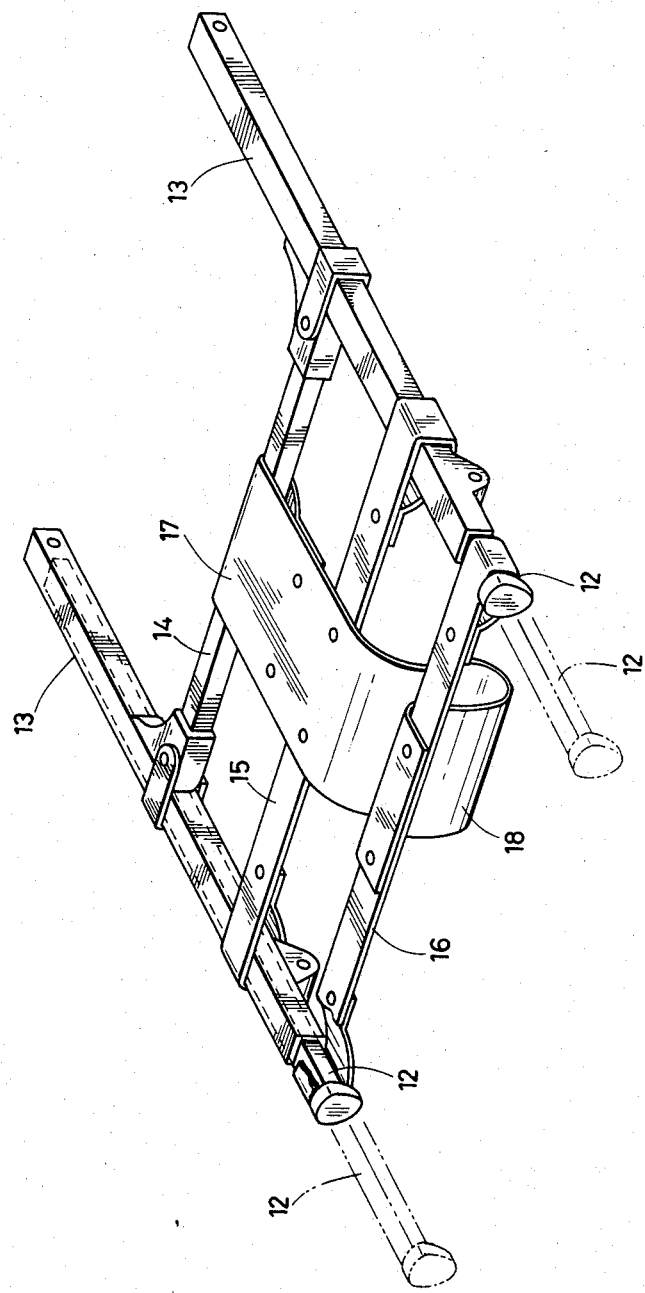
FIG. 4 is a perspective view showing the draw links of FIG. 1 and the related arrangement.

Referring to FIG. 4, the draw links 12 are inserted in a pair of longitudinally extending tubular members 13 installed on the baby carriage body and are thereby slidably held. A widthwise extending connecting bar 14 and a first widthwise extending connecting belt 15 are connected between the tube members 13. Further, a second widthwise extending connecting belt 16 is connected between the front ends of the draw links 12. A wide belt 17 is installed intermediate between the tube members 13 to extend parallel to the tube members 13 so as to connect the widthwise extending connecting bar 14, first widthwise extending belt 15, and second widthwise extending connecting belt 16. The widthwise extending connecting bar 14, widthwise extending connecting belts 15 and 16, and wide belt 17 contact the lower surface of the bottom wall 2 of the bed 1 to perform the function of auxiliarily supporting the bottom wall 2. The state shown in solid lines in FIG. 4 is one in which the draw links 12 are retracted, with a slack 18 formed in the wide belt 17. When the draw links 12 are forwardly withdrawn as shown in phantom lines in FIG. 4, the slack 18 disappears and the terminal end of the forward withdrawal of the draw links 12 is defined.

The front portions 5a and 6a the left-hand and right-hand side walls 5 and 6 are constructed so that they are separable from the rear portions 5b and 6a, and separate joint means are provided therefor. For example, zippers 19 are attached along the boundary lines between the front portions 5a, 6a and the rear portions 5b, 6b. Further, the front wall 3 is constructed so that it is separable from the left-hand and right-hand side walls 5 and 6. Zippers 20 are provided along the boundary lines between the front wall 3 and the left-hand and right-hand side walls 5 and 6. The zippers 19 and 20 are fixed in position so that they can be opened from the top.

In addition, as shown in phantom lines in FIG. 1, a hood 21 may be installed to cover a relatively rear region of the bed 1.

In FIG. 1, the draw links 12 are forwardly withdrawn to support the front portions 2a, 5a and 6a of the bottom wall 2 and left-hand and right-hand side walls 5 and 6, and the front wall 3, with the bed 1 assuming its original bed form. That is, the front and rear portions 2a and 2b of the bottom wall 2 are in a substantially horizontal plane.

To change the aforesaid bed form into chair form, the draw links 12 will be rearwardly retracted. The zippers 19 and 20 are then opened. In response thereto, the front portion 2a of the bottom wall 2 is turned downwardly and the front portions 5a and 6a of the left-hand and right-hand side walls 5 and 6 overlie the downwardly turned front portion 2a of the bottom wall 2. Since the front wall 3 is flexible it may be rolled up as shown in FIG. 3. In addition, to hold the front wall 3 in this rolled state, suitable strings or the like (not shown) may be used. Thus, the front of the bed 1 is opened to enable the bed to be used as a chair. That is, the baby is allowed to project his legs forwardly of the bed 1. At this time, the front portion 2a of the bottom wall 2 and the front portions 5a and 6a of the left-hand and right-hand side walls 5 and 6 extend along the back sides of the legs for protecting the legs.

In addition, when the bed is changed into a chair form, the backward half region of the rear portion 2b of the bottom wall 2 may be utilized to form a backrest. For example, the arrangement may be such that the rear backward half core 9 rises from the bottom wall 2 and is supported by a support member 22 for forming a backrest.

To restore the bed 1 to its original bed form, the draw links 12 are forwardly withdrawn and then the zippers 19 and 20 are closed.

Referring to the embodiment of FIGS. 5 to 9, the front and rear portions 1a and 1b of the bed 1 are of separable construction. To this end, the front portions 5a and 6a of the left-hand and right-hand side walls 5 and 6 are arranged to be separable from each other. The front portions 5a and 6a of the left-hand and right-hand side walls 5 and 6 are connected to the rear portions 5b and 6b by zippers 23. Further, the front portions 5a and 6a of the left-hand and right-hand side walls 5 and 6 are connected to the front wall 3 by zippers 24. Further, the front portion 2a of the bottom wall 2 is disposed on a level different from that of the rear portion 2b; for example, in this embodiment, the front portion 2a underlies the rear portion 2b.

More particularly, the front portion 2a of the bottom wall 2 is attached to the upper sides of the draw links 12. The tube members 13, adapted to slidably receive the draw links 12, have slits 25 for receiving, during the slide movement of the draw links 12, the front portion 2a and the front portions 5a and 6a of the left-hand and right-hand side walls 5 and 6 which are folded to overlie said front portion 2a as will be later described. The rear portion 2b of the bottom wall 2 is fixedly placed on the tube members 13. In addition, to minimize the clearance between the front and rear portions 2a and 2b of the bottom wall 2 which are on different levels, the size of the front portion 2a is such that even when it is forwardly withdrawn to the limit, the rear end of the front portion 2a overlaps with the front end of the rear portion 2b.

When the draw links 12 are forwardly withdrawn and the zippers 23 and 24 are closed, the bed 1 is in its original bed form. To change the bed 1 from this form into chair form, the following operation is involved.

Figure 6:
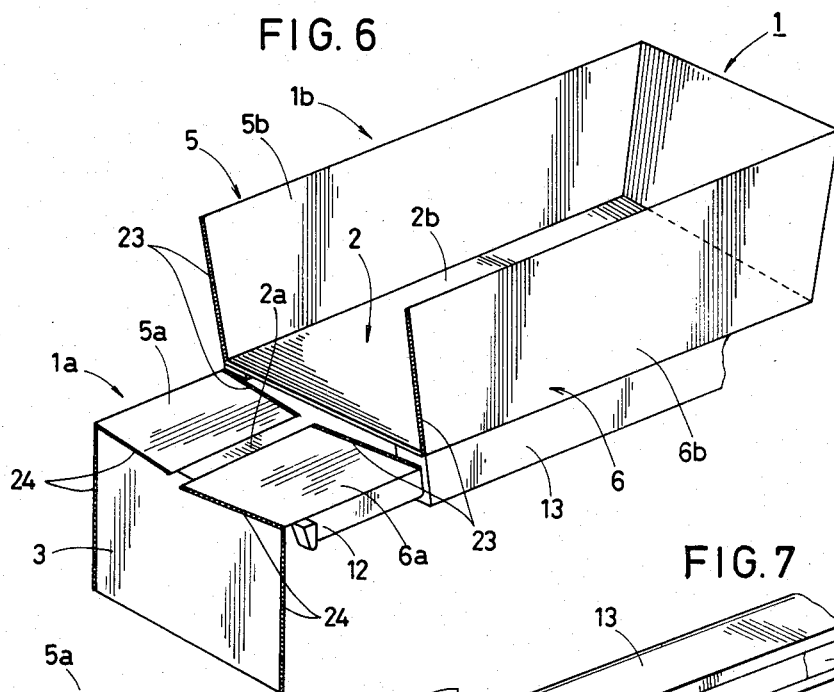
FIG. 6 is a perspective view of the bed of FIG. 5, showing an intermediate state of the change into a chair form.
Figure 7:
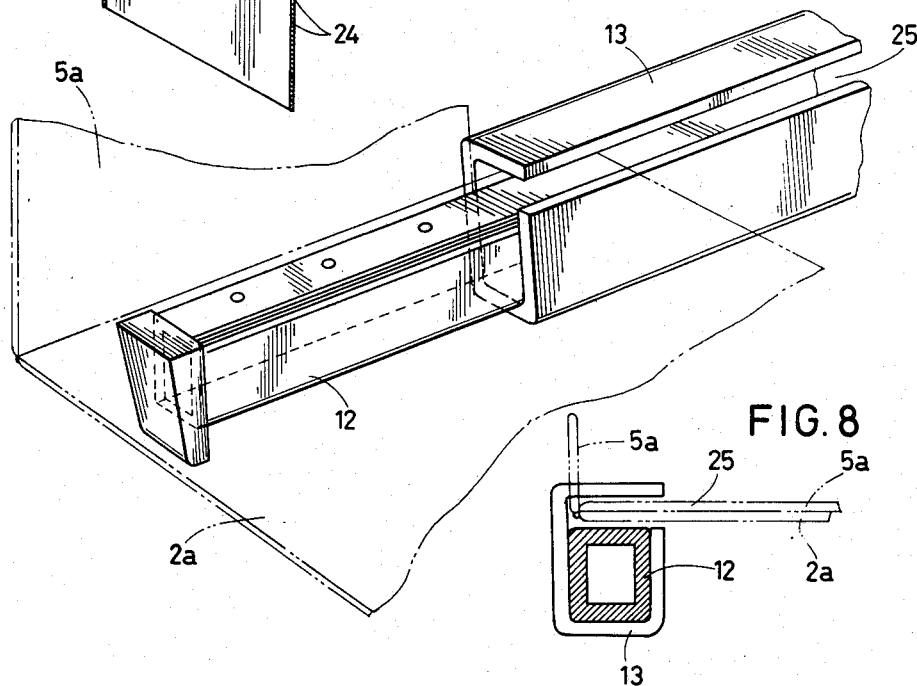
FIG. 7 is an enlarged perspective view showing a draw link of FIGS. 5 and 6 and the related arrangement.
Figure 8:
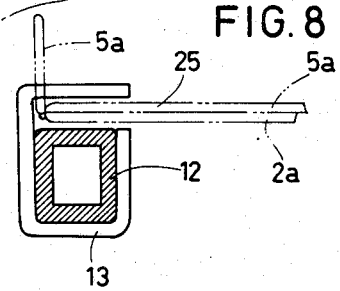
FIG. 8 is a front view, partly in section, showing the relation between the draw link and a tubular member of FIG. 7.

First, as shown in FIG. 6, the zippers 23 and 24 are opened and the front portions 5a and 6a of the left-hand and right-hand side walls 5 and 6 are folded on the front portion 2a of the bottom wall 2. The front wall 3 is allowed to hang down. In this state, the draw links 12 are rearwardly pushed in. In response thereto, the front portion 2a of the bottom wall 2 and the front portions 5a and 6a of the left-hand and right-hand side walls 5 and 6 are passed through the slits 25 and received under the rear portion 2b of the bottom wall 2, whereby the state shown in FIG. 9 is obtained in which the front of the bed 1 is opened to enable the bed to be used as a chair.

In addition, when it is desired to restore the chair form to the original bed form, the reverse of the operation described above will be performed.

Figure 5:
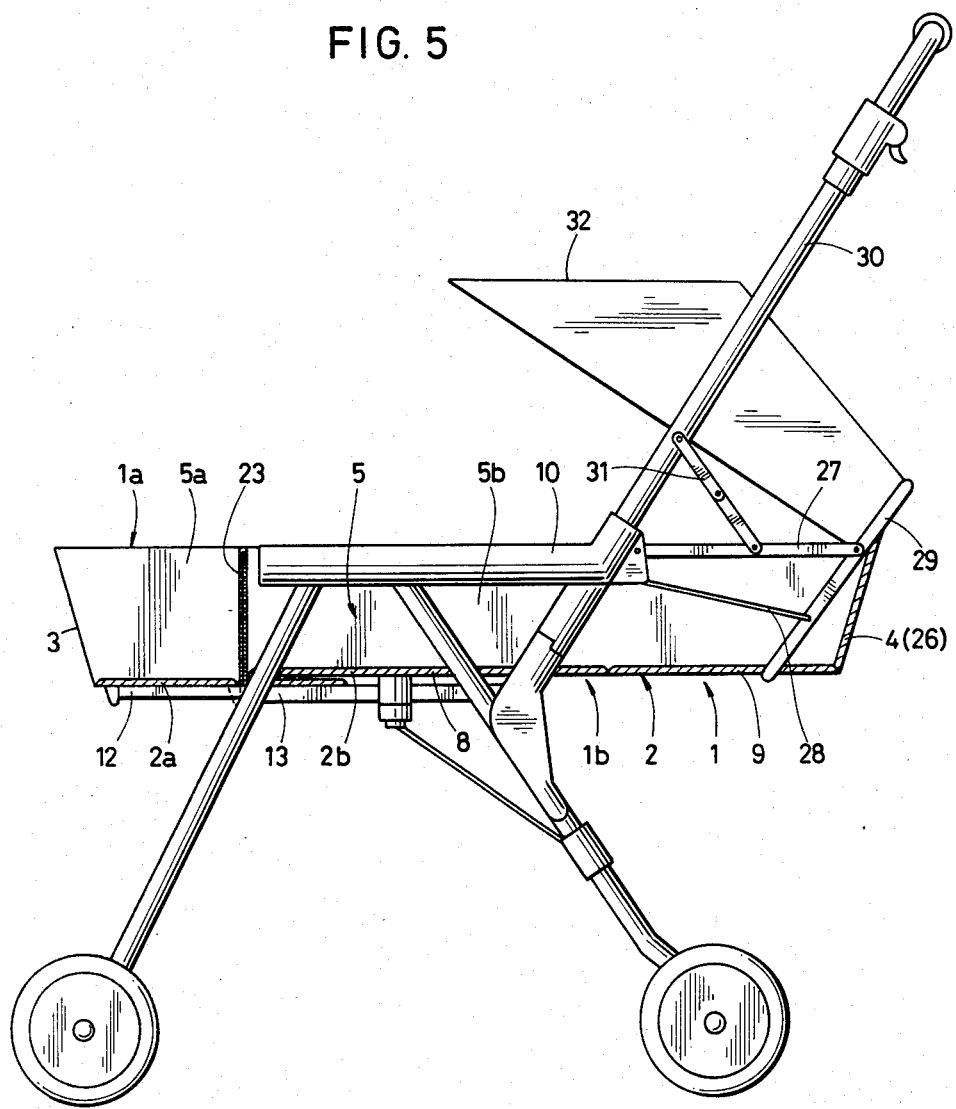
FIG. 5 is a right-hand side view of a baby carriage showing another embodiment of this invention, with the bed shown in its original bed form.
Figure 9:
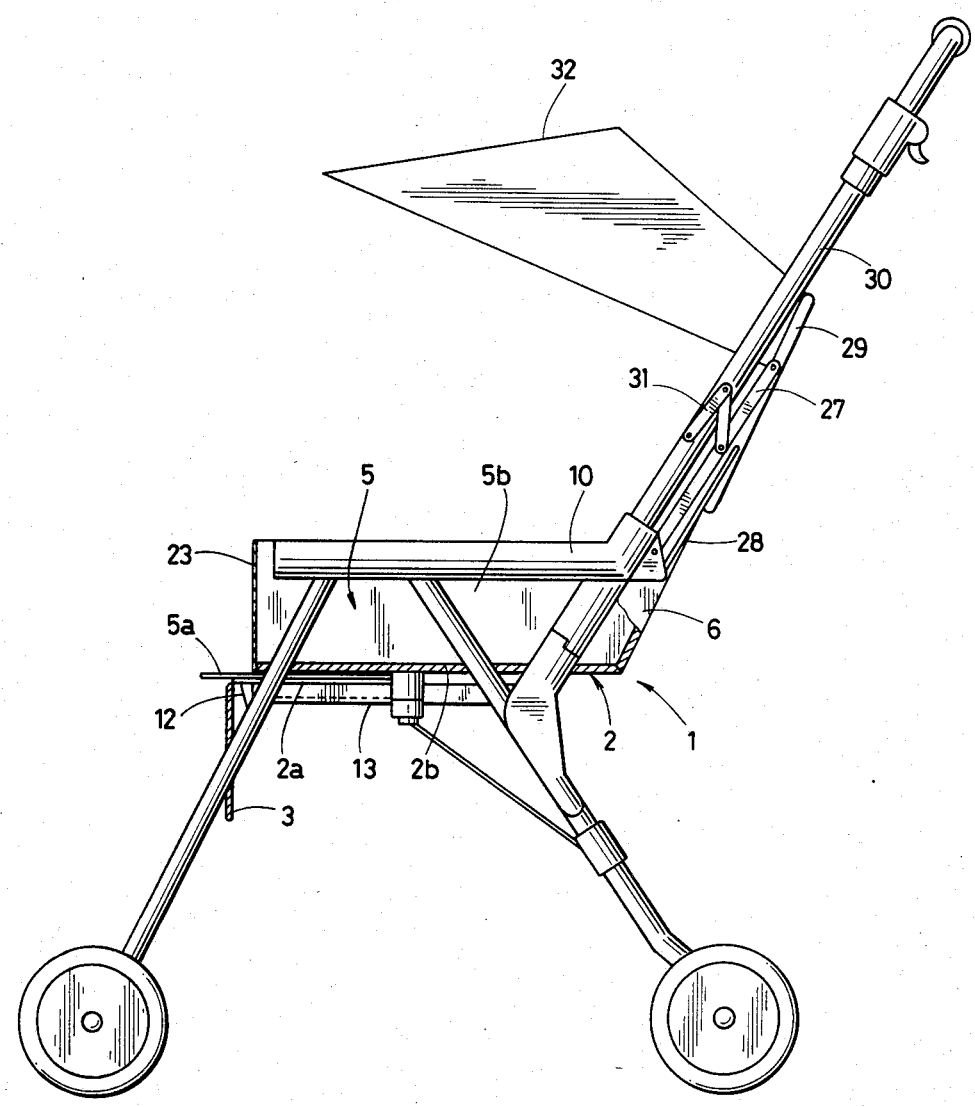
FIG. 9 shows the bed of the baby carriage of FIG. 5 changed into a chair form.

FIGS. 5 and 9 also show another example of an arrangement for forming a backrest having a back core 26 as the hard core to be incorporated in the back wall 4. Main levers 27 are turnably supported in the rear ends of handrails 10 which are part of the baby carriage body. Below the main levers 27, auxiliary levers 28 are turnably supported in the rear ends of the handrails 10. Rear bed portion support members 29 are held by the main and auxiliary levers 27 and 28 and directly support the rear end of the rear portion 1b of the bed 1. Reclining adjusting links 31 are connected between the main levers 27 and pusher bars 30, the arrangement being such that a change of the bent state of the reclining adjusting links 31 causes a change of the inclined state of the main levers 27. When the main levers 27 are in the horizontal state as shown in FIG. 5, the bottom wall 2 in the rear end portion of the bed 1 supported by the rear bed portion support member 29 is also held horizontal, with the bed assuming its original bed form. When the main levers 27 stand up as shown in FIG. 9, the rear bed portion support members 29 are displaced upwardly and the back wall 4 is raised and so is the portion of the bottom wall 2 having the rear backward half core 9 incorporated therein. As a result, a backrest is formed by the portion having the rear backward half core 9 and by the back wall 4. The auxiliary levers 28 control the attitude of the rear bed portion support members 29; for example, in the FIG. 9 state, they force the rear bed support members 29 to abut against the back of the bottom wall 2 so that the back wall 4 is aligned with the portion having the rear backward half core 9.

The hood 32 mau be installed in position by making use of the rear bed portion support member 29.

Figure 10:
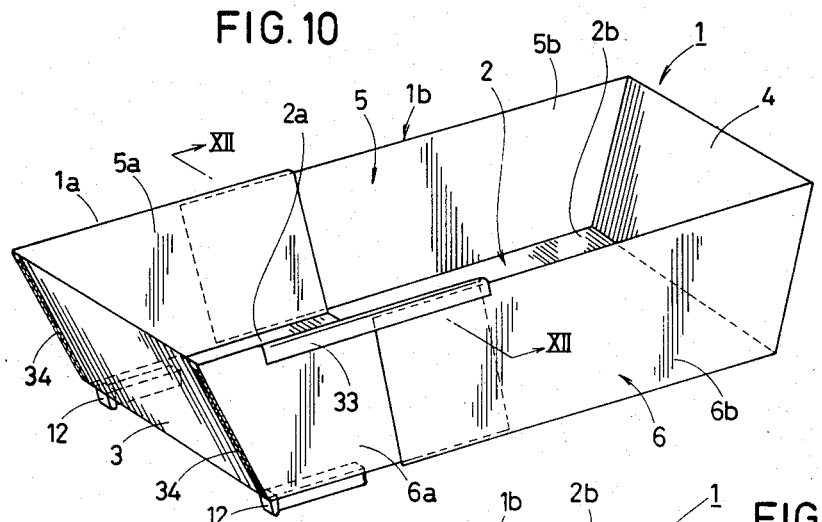
FIG. 10 is a perspective view of a modified bed form.
Figure 11:
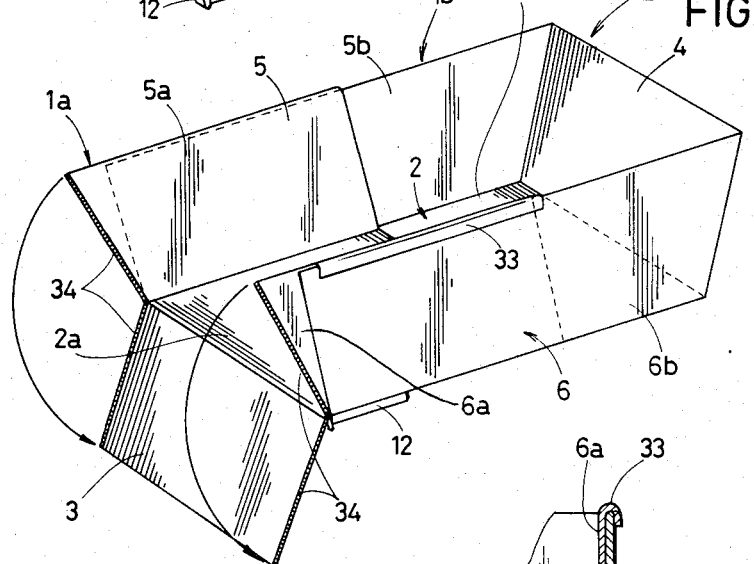
FIG. 11 is a perspective view of the bed of FIG. 10 changed into chair form.
Figure 12:
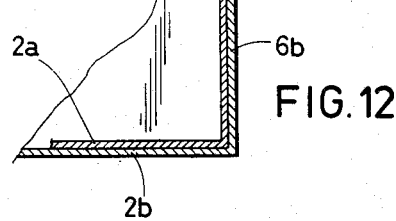
FIG. 12 is a sectional view taken along the line XII—XII in FIG. 10.

In the modification of FIGS. 10, 11, and 12, the front and rear portions 1a and 1b and the bed 1 are formed of separate members. The front portion 1a is held by a pair of draw links 12. The front portion 1a of the bed 1 is made up of the front portions 2a, 5a, and 6a of the bottom wall 2 and left-hand and right-hand side walls 5 and 6 and the front wall 3. The rear portion 1b of the bed 1 is made up of the rear portions 2b, 5b, and 6b of the bottom wall 2 and left-hand and right-hand side walls 5 and 6 and the back wall 4. The front portions 1a of the bed 1 is arranged to overlie the rear portion 1b. Engaging rails 33 are formed along the upper edges of the front portions 5a and 6a of the left-hand and right-hand side walls 5 and 6 and engage the upper edges of the rear portions 5b and 6b of the left-hand and right-hand side walls 5 and 6, as best shown in FIG. 12. The front wall 3 is constructed so that it is separable from the front portions 5a and 6a of the left-hand and right-hand side walls 5 and 6, with zippers 34 attached along the boundary lines therebetween. The zippers 34 are adapted to be opened from the top.

In the state shown in FIG. 10, the draw links 12 are forwardly withdrawn to hold the front portion 1a of the bed 1. In this manner, the bed 1 assumes its original bed form.

For changing the bed into a chair form as shown in FIG. 11, the user operates the draw links 12 to retract them rearwardly. In response thereto, the front portion 1a of the bed 1 is rearwardly displaced as guided by the engaging rails 33. In addition, to avoid interference of the region where the draw links 12 are attached to the front portion 2a of the bottom wall 2 with the rear portion 2b of the bottom wall 2 during this operation, the draw links 12 are attached only at their front ends to the front portion 2a of the bottom wall 2. Further, if necessary, a suitable cut may be formed in the front end of the rear portion 2b of the bottom wall 2. To remove the front wall 3 from the front of the bed 1, the zippers 34 are downwardly slid for opening. As a result, the front wall 3 changes down, with the front of the bed 1 being opened to enable the bed to be used as a chair.

While the invention has been described so far with reference to some embodiments thereof, modifications are possible. For example, while the front wall 2 has been treated by being rolled as shown in FIG. 3, it may be allowed to hang down or it may be placed on the front portion 2a of the bottom wall 2. Further, while the front wall 3 has been allowed to hang down as shown in FIG. 6, it may be rolled as shown in FIG. 3 or it may be placed on the front portion 2a of the bottom wall 2. Further, as shown in FIGS. 10 through 12, the front portion 1a of the bed 1 has been constructed to be positioned inside the rear portion 1b, but this arrangement may be reversed. Further, the zippers used in these embodiments may be replaced by other separable joint means such as hooks, buttons, and velvet fasteners.

While the foregoing description has made no mention of the collapsing of the baby carriage, it is possible to obtain a bed which satisfactorily follows the collapsing operation of the baby carriage by selecting suitable materials forming the baby carriage of suitably designing the connections between the materials, such bed being applicable to both collapsible and uncollapsible baby carriages.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bed for baby carriages which is in the form of a box as a whole comprising a bottom wall (2), a front wall (3), a back wall (4), and left-hand and right-hand walls (5,6), wherein longitudinally slidable draw links (12) are provided on both sides under the bottom wall (2) so that when the draw links (12) are forwardly withdrawn, they hold front portions (2a, 5a, 6a) of the bottom wall (2) and left-hand and right-hand side walls (5, 6) and the front wall (3), means for separating said front portions (5a, 6a) of the left-hand and right-hand side walls (5, 6) from their respective rear portions (5b, 6b), wherein said front portions (2a) of the bottom wall (2) are displaceable with respect to the rear portion (2b), means arranged so that when the draw links (12) are rearwardly retracted, the front portions (2a, 5a, 6a) of the bottom wall (2) and left-hand and right-hand side walls (5, 6) and the front wall (3) are displaced in such a manner as to open the front of the baby carriage bed to enable the bed to be used as a chair, wherein said front and rear portions (2a, 2b) of the bottom wall (2) are formed of separate members disposed on different levels, said front portion (2a) being attached to said draw links (12), so that when the draw links (12) are rearwardly retracted, the front and rear portions (2a, 2b) slide in a mutually overlapping relation, wherein said front wall (3) is constructed to be separable from the left-hand and right-hand side walls (5, 6), said front wall being foldable along a boundary line between the front wall (3) and the bottom wall (2), wherein said front portion (2a) of the bottom wall (2) lies below the plane of said rear portion (2b), and comprising means for folding said front portions (5a, 6a) of the left-hand and right-hand side walls (5, 6) along a boundary line between said side walls and the front portion (2a) of the bottom wall (2), so that when the draw links (12) are rearwardly retracted, the front portions (5a, 6a) of the left-hand and right-hand side walls (5,6), which are now folded on the front portion (2a) of the bottom wall (2), are received under the rear portion (2b) of the bottom wall (2).

* * * * *